United States Patent [19]

Kalkunte et al.

[11] Patent Number: 6,078,591
[45] Date of Patent: Jun. 20, 2000

[54] APPARATUS AND METHOD FOR SELECTIVELY MODIFYING COLLISION DELAY INTERVALS BASED ON A DETECTED CAPTURE EFFECT IN HALF-DUPLEX NETWORK

[75] Inventors: Mohan V. Kalkunte, Sunnyvale; Simon L. H. Liang, Fremont, both of Calif.

[73] Assignee: Advanced Micro Devices, Inc., Sunnyvale, Calif.

[21] Appl. No.: 08/896,099

[22] Filed: Jul. 17, 1997

[51] Int. Cl.[7] .................................................. H04L 12/413
[52] U.S. Cl. .......................... 370/448; 370/462; 709/225
[58] Field of Search .................................... 370/445, 447, 370/448, 462; 709/225

[56] References Cited

U.S. PATENT DOCUMENTS

| | | | |
|---|---|---|---|
| 5,319,641 | 6/1994 | Fridrich et al. . | |
| 5,353,287 | 10/1994 | Kuddes et al. . | |
| 5,383,185 | 1/1995 | Armbruster et al. . | |
| 5,404,353 | 4/1995 | Ben-Michael et al. . | |
| 5,418,784 | 5/1995 | Ramakrishnan et al. . | |
| 5,422,887 | 6/1995 | Diepstraten et al. . | |
| 5,436,903 | 7/1995 | Yang et al. . | |
| 5,526,355 | 6/1996 | Yang et al. . | |
| 5,546,543 | 8/1996 | Yang et al. . | |
| 5,717,889 | 2/1998 | Rettig | 370/447 |
| 5,784,375 | 7/1998 | Kalkunte et al. | 370/448 |
| 5,822,538 | 10/1998 | Krishna et al. | 370/447 |
| 5,838,688 | 11/1999 | Kadambi et al. | 370/448 |
| 5,850,525 | 12/1998 | Kalkunte et al. | 370/447 |
| 5,852,723 | 12/1998 | Kalkunte et al. | 370/448 |
| 5,854,900 | 12/1998 | Kalkunte et al. | 370/448 |
| 5,894,559 | 4/1999 | Krishna et al. | 370/448 |

FOREIGN PATENT DOCUMENTS

| | | |
|---|---|---|
| 0632619 A2 | 4/1995 | European Pat. Off. . |
| 0632620 | 4/1995 | European Pat. Off. . |
| 0632621 A2 | 4/1995 | European Pat. Off. . |

OTHER PUBLICATIONS

AMD, AM79C970 PCnet™–PCI Single–Chip Ethernet Controller for PCI Local Bus, Jun. 1994, pp. 1–868–1–1033.

Hayes, Wayne et al., "Solving Capture in Switched Two–Node Ethernets by Changiung Only One Node," IEEE 0742–1303/95, 1995, pp. 387–395.

Comer, D.E. et al., "A Rate–Based Congestion Aviodance and Control Scheme for Packet Switched Networks," Proceedings of the International Conference on Distributed Computing Systems, Paris, May 28–Jun. 1, 1990, Conf. 10, May 28, 1990, IEEE, pp. 390–397.

(List continued on next page.)

*Primary Examiner*—Min Jung

[57] ABSTRACT

Collision delay intervals are modified in a network node in order to overcome a detected capture effect in a half-duplex network. A network interface having a media access control (MAC) selectively modifies the collision delay interval based on detected capture effect. In one implementation, a node that has been locked out resets its attempt counter to become more aggressive in contending for the media. In applications requiring a guaranteed access, the attempt counter is reset and the collision delay interval is forced to zero slot times to attempt immediate access of the media following a collision. If the network includes multiple applications requiring guaranteed access, a node having encountered collisions switches from normal operation under the truncated binary exponential backoff (TBEB) algorithm to a shifted TBEB operation. If the node has captured the media, the node increases its attempt counter by a prescribed value to provide a less aggressive contention during collision mediation.

19 Claims, 9 Drawing Sheets

OTHER PUBLICATIONS

Williamson, C.L. et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

APPARATUS AND METHOD FOR SELECTIVELY MODIFYING COLLISION DELAY INTERVALS BASED ON A DETECTED CAPTURE EFFECT IN HALF-DUPLEX NETWORK

BACKGROUND OF THE INVENTION

1. Technical Field

The present invention relates to network interfacing and, more particularly, to methods and systems for transmitting data packets in a half-duplex network susceptible to capture effect.

2. Background Art

Local area networks use a network cable or other media to link stations on the network. Each local area network architecture uses a media access control (MAC) enabling a network interface card at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet network nodes mediate collisions using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of slot times from the range of zero to $2^j-1$. For example, if the number of attempts j=3, then the range of randomly selected number of slot times is [0,7]; if the randomly-selected number of slot times is four, then the collision backoff interval will be equal to four slot time intervals. According to Ethernet protocol, the maximum range of randomly selected slot times is $2^{10}-1$.

The truncated binary exponential algorithm has the disadvantage that the range of randomly selected slot times [0, $2^j-1$] increases exponentially each time a specific station loses a retry attempt after collision, resulting in a higher probability of losing the next collision mediation by randomly selecting a larger integer multiple of slot times. Thus, a new station that has data to transmit has a higher probability of winning a collision mediation than the station having a greater number of attempts. This effect is known as the capture effect, where a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks.

The capture effect also may occur between network nodes having different capabilities in counting the transmission delay interval before attempting access of the media. Ethernet protocol specifies the transmission delay interval after sensed deassertion of the receive carrier, i.e., the interpacket gap (IPG) interval, as having a minimum value before stations can attempt access of the media. Network nodes (i.e., network nodes) that are capable of minimizing the transmission delay to the IPG interval, referred to as "fast nodes" or "dominant stations," will begin to transmit before stations incapable of achieving the minimum IPG interval, referred to as "slow nodes." In other words, hardware limitations may prevent the slow nodes from accessing the media within the time interval defined by the IPG interval. Hence, dominant network nodes will tend to capture the media over slower nodes that wait a longer time before attempting access of the media. These slower nodes encounter a surrender effect, in which they "surrender" their access to the media due to hardware limitations. The surrender effect may create substantial throughout problems in transmission protocols requiring a sender to receive an acknowledgement within a prescribed interval after a burst transmission.

Hence, capture effect may be caused by a station encountering a large number of collisions, variance in IPG access times between fast and slow nodes, and variations in propagation delay due to network topology. The capture effect thus causes a large variance in the network access latency, and a corresponding large variance in end to end delays experienced by data packets.

One proposed solution is described in Remakrishman et al., "The Ethernet Capture Effect: Analysis and Solution," IEEE Local Computer Networks (LCN) Conference, Minneapolis, Minn., October 1994, pages 228–240. The proposed solution by Ramakrishman, referred to as capture avoidance binary exponential backoff (CABEB), uses the standard binary exponential backoff with enhancements for collision resolution in a special case when a station attempts to capture the channel subsequent to an uninterrupted consecutive transmit period.

The CABEB algorithm modifies the truncated binary exponential backoff algorithm based on the premise that there can be no more than one station in an uninterrupted consecutive transmit state at any given time on a CSMA/CD local area network. The CABEB algorithm calculates the collision backoff interval for an uninterrupted consecutive transmission as follows: if the number of collision attempts equals 1, then the collision backoff interval equals two (2) slot time intervals; if the number of collisions equals 2, then the collision backoff interval equals zero (0) slot times; and if the number of collision attempts is greater than 2, then the conventional TBEB algorithm is followed.

Although the CABEB algorithm reduces the capture effect, implementation of the CABEB algorithm in small networks, such as a 2-station or 3-station Ethernet network, substantially increases the collision rate. The CABEB algorithm also reduces the network throughput, especially for small packets.

Another proposed media access mechanism, referred to as the Binary Logarithmic Access Method (BLAM), are described by the IEEE 802.3 w Working Group Draft, "Enhanced Media Access Control Algorithm for IEEE 802.3 CSMA/CD." However, BLAM requires substantial changes to the MAC, and has not been proven effective in a mixed environment having stations employing BLAM nodes and TBEB nodes.

DISCLOSURE OF THE INVENTION

There is a need for a method of accessing media of an Ethernet network that increases the throughput of the Ethernet network under heavy traffic loads.

There is also a need for a method of accessing media of an Ethernet network that minimizes the occurrence of the capture effect.

There is also a need for an arrangement for accessing the media of a half-duplex shared network that provides bounded access latencies.

There is also a need for a method of accessing media of a shared network, where a network node is able to eliminate a capture effect, independent from the activity of other network nodes.

These and other needs are attained by the present invention, where the collision delay interval calculated by a network node upon encountering a collision on the network is modified based upon the detection of a capture effect on the medium.

According to one aspect of the present invention, a method of accessing network media by a network node comprises detecting a capture effect on the network media based on a prescribed threshold, sensing a collision on the network media, selectively determining a slot time interval from one of (1) a first integer randomly selected from a range of integers calculated from an exponential number of access attempts by the network node, and (2) a modified number of slot times in response to the detected capture effect, and attempting access of the media in response to the detected collision and after the selectively determined slot time interval. By selectively determining a slot time interval in response to the detected capture effect, a modified slot time interval can be used during collision mediation in order to overcome the capture effect. In the case of other network nodes having captured the media, the slot time interval may be reduced to provide more aggressive contention of the media. Conversely, detection that the network node has captured the media may cause the modified number of slot times to be increased, enabling other network nodes to regain access to the network media.

Another aspect of the present invention provides a network interface comprising a collision sensor configured for sensing a collision on the media, capture logic configured for determining capture of the network media, a collision interval calculator configured for selectively calculating a delay time based on a number of access attempts by the network interface and the determined capture of the network media, and a media access device configured for attempting access of the media in response to the sensed collision and after the calculated delay time. The capture logic enables the network interface to determine whether the network media has bene captured, for example by that network interface or another network node, enabling the collision interval calculator to selectively calculate the delay time to overcome the capture effect, either by providing a more aggressive collision mediation to reclaim the network, or by increasing the delay time to enable other network nodes to access the media.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiments are directed to arrangements for overcoming capture effect on the media, independent of activities of other network nodes. As described in detail below, the disclosed embodiments are directed to overcoming capture effect by providing more aggressive contention over other network nodes, or by releasing contention for the media in the event that the network node has captured the media from other network nodes. A description will first be given of an exemplary network interface for carrying out the arrangements for accessing the media, followed by a description of the various embodiments and applications for eliminating capture effect.

Figure 1:
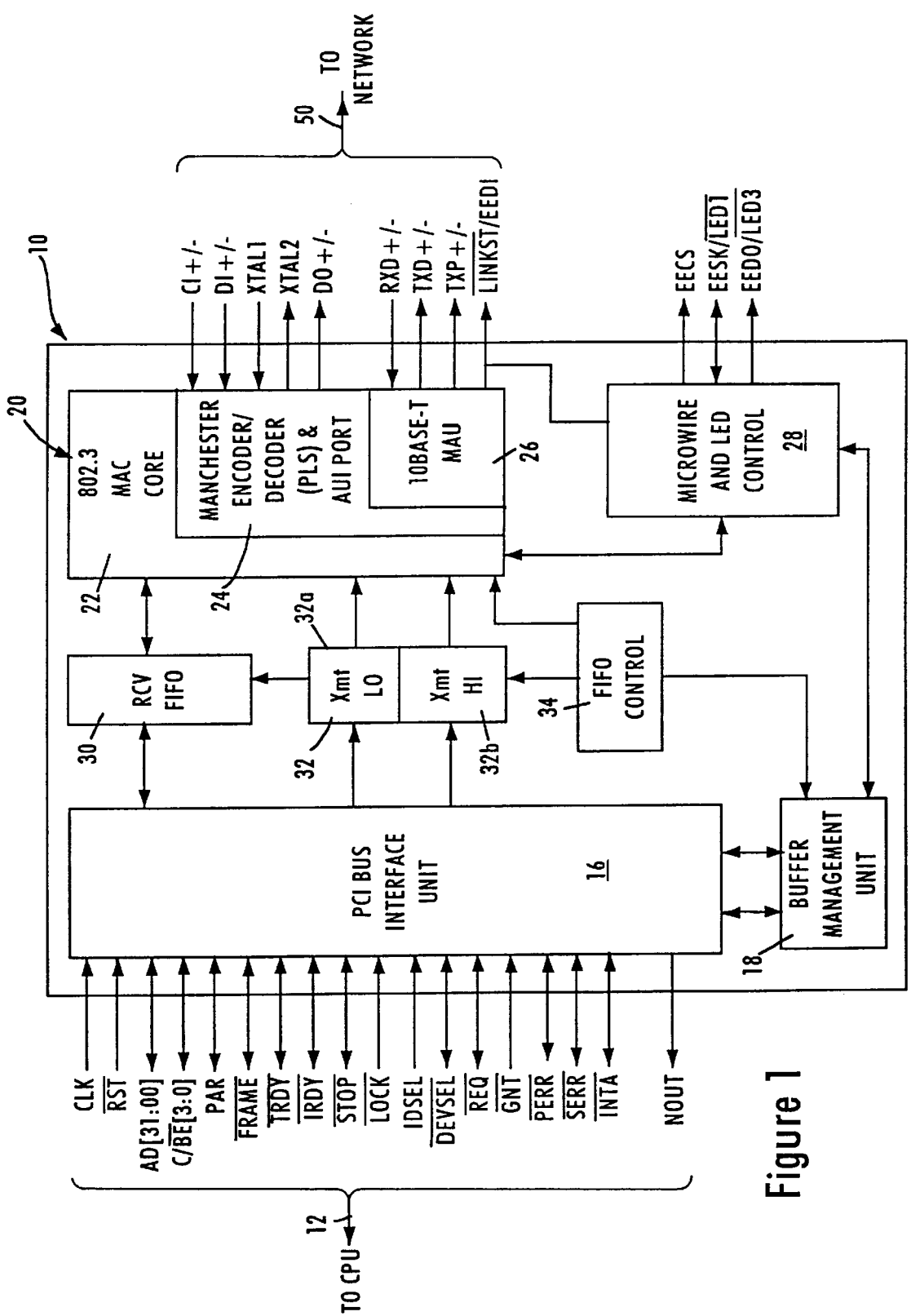
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1–868 to 1-1033 of the AMD Ethernet/IEEE 802.3 Family 1994 World Network Data Book/Handbook. The network interface may also be implemented in a switch port of a network switch. Hence, the term "network node" covers both a network switch port and a network station.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer via the PCI bus 12. The PCI bus interface unit 16, under the control of the DMA buffer management unit 18, receives transfers from the host computer via the PCI bus 12. The data frames received from the PCI bus interface unit 16 are based transferred to the transmit FIFO 32. The transmit FIFO 32 has two queues, namely a low priority queue (LO) 32a and a high priority queue (HI) 32b for storing low and high priority data from the PCI bus interface unit 16, respectively.

The buffer management unit 18 manages the reception of the data by the PCI bus interface unit 16 and retrieves information from header bytes that are transmitted at the beginning of transmissions via the PCI bus 12. The header information identifying the byte length of the received frame is passed to the FIFO control 34.

The Manchester encoder and attachment unit interface (AUI) 24 includes a Collision In (CI+/−) differential input pair, operating at pseudo ECL levels, that signals to the network interface 10 when a collision has been detected on the network media. A collision occurs when the CI inputs are drive with a 10 MHz pattern of sufficient amplitude and pulse width that meets the ISO/IEC 8802-3 (ANSI/IEEE 802.3) standards. The Data Out (DO+/−) output pair of the AUI 24 transmits Manchester encoded data at pseudo ECL levels onto the network media 50. Similarly, the twisted pair interface 26 includes 10BASE-T port differential receivers (RXD+/−) and 10BASE-T port differential drivers (TXD+/−).

The media access control (MAC) 20 performs the CSMA/CD functions in response to signals from the interfaces 24 or 16. For example, carrier sense is detected by the DI and RXD signal paths of the AUI port 24 and MAU 26, respectively. The AUI 24 detects a collision by the CI inputs, and the MAU 26 detects a collision by sensing activity on both twisted pair signals RXD and TXD. Additional functions of the MAC 20 are described below.

The media 50 may be either coaxial, fiber optic, or twisted pair wire, and hence may couple the interface 10 to 10BASE-T, 10BASE-2, 100BASE-TX, 100BASE-T4, or 100BASE-FX networks. The network may operate at 10 megabits per second (10 Mbits/s), 100 megabits per second (100 Mbits/s), or 100 megabits per second (100 Mbits/s).

BREAKING CAPTURE EFFECT BY A NODE THAT IS LOCKED OUT

Capture effect may be encountered by a network node that is locked out or has no control over another network node that has captured the network media, or a group of network nodes that have captured the network. The network node may be either a switched port or an end station. In such instances, it is desirable for the network node to become more aggressive in contending for the medium in order to transmit a data packet.

Figure 2A:
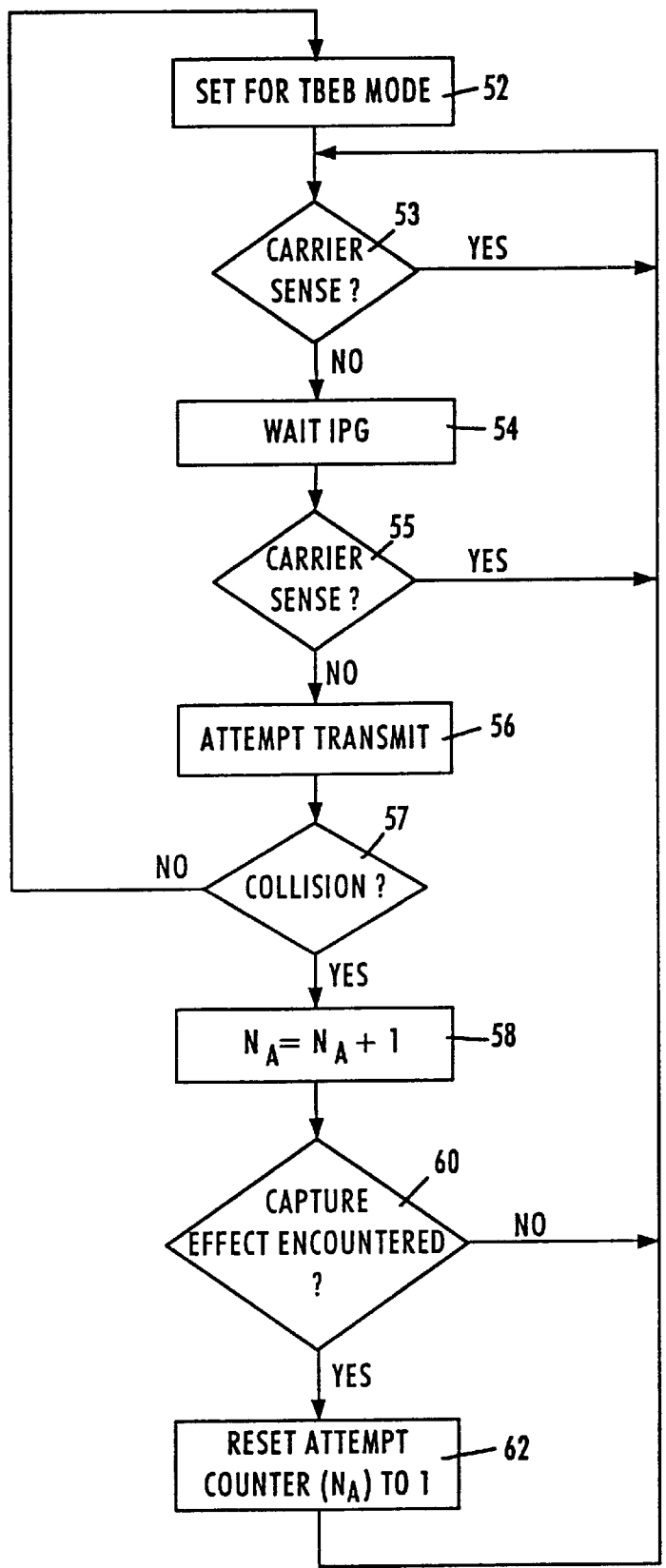
FIGS. 2A, 2B, 2C and 2D are flow diagrams summarizing a method for accessing media of the network according to a first embodiment of the present invention.
Figure 2B:
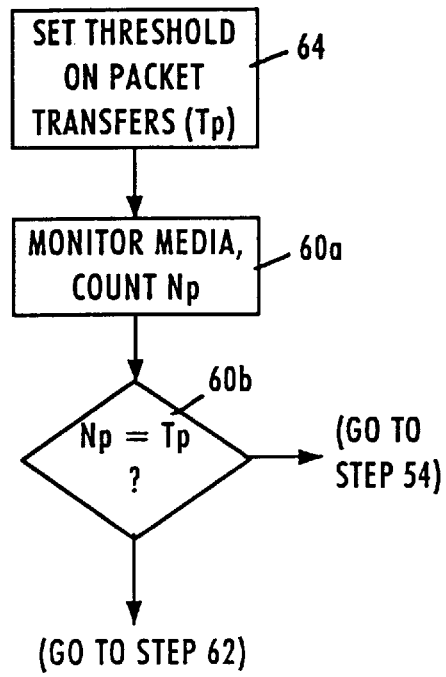

FIGS. 2A and 2B are flow diagrams summarizing a method by a network node for accessing the media 50 of an Ethernet network according to a first embodiment of the present invention. The method of the first embodiment, as well as the second, third, and fourth embodiments described below, may be implemented as state machines within the MAC 22, or by embedding executable code within a memory element in the MAC 22 (e.g., register, EPROM, EEPROM, flash memory). The desired embodiment is then executed by setting a prescribed code in a user-accessible register.

The media access controller (MAC) 22 begins in step 52 by resetting itself for operation according to the conventional truncated binary exponential backoff (TBEB) algorithm. The MAC 22 then checks the transmit FIFO 32 to determine the presence of data to be transmitted on the media 50, and determines if a carrier is sensed in step 53. If a carrier is sensed, the MAC 22 waits until deassertion of the carrier to wait at least a minimum interpacket gap (IPG) interval in step 54. Specifically, the MAC 22 checks if a receive carrier is sensed on the media using the CSMA/CD. If the receive carrier is sensed, the MAC 22 waits until deassertion of the receive carrier on the media 50, and waits the minimum IPG before transmitting a data packet on the network media. The minimal IPG interval is 9.6 microseconds for a 10 Mbit/s network, 0.96 microseconds for a 100 Mbit/s network, and 0.096 microseconds for a gigabit (1000 Mbit/s) network.

Assuming the transmit FIFO 32 has a data frame to be transmitted and no carrier is detected in step 55 while waiting the minimum IPG, the MAC 22 attempts to transmit the data packet in step 56. After the transmission attempt has begun in step 56, the MAC 22 checks in step 57 to determine whether a collision has been detected. If no collision is detected, then the transmission of the data packet is completed and the process returns to step 52.

If a collision is detected in step 57, the MAC increments an attempt counter ($N_A$) in step 58 and performs collision mediation according to the TBEB algorithm, described with respect to FIG. 5 below. As described below, the MAC 22 determines the slot time interval based on an integer randomly selected from a range of integers, where the range of integers is calculated from an exponential number of access attempts. After waiting the calculated number of slot times, the network node waits the minimum IPG and begins transmission if no receive carrier is sensed. If collision occurs a second time, then collision mediation is repeated according to the TBEB algorithm.

If the MAC 22 determines in step 60 that collision mediation was successful resulting in transmission of the data packet such that no capture effect was encountered, the MAC 22 returns to step 52. If the MAC 22 determines that the collision mediation was not successful and that capture effect is detected in step 60, where at least one other network node has gained control of the network media as described below, then the MAC 22 resets an internal collision attempt counter ($N_A$) to one in step 62.

Hence, if the network node suffers an increasing number of collisions, such that the attempt counter increases, the attempt counter ($N_A$) is reset to one in order to give the network node a greater probability of accessing the media.

Figure 5:
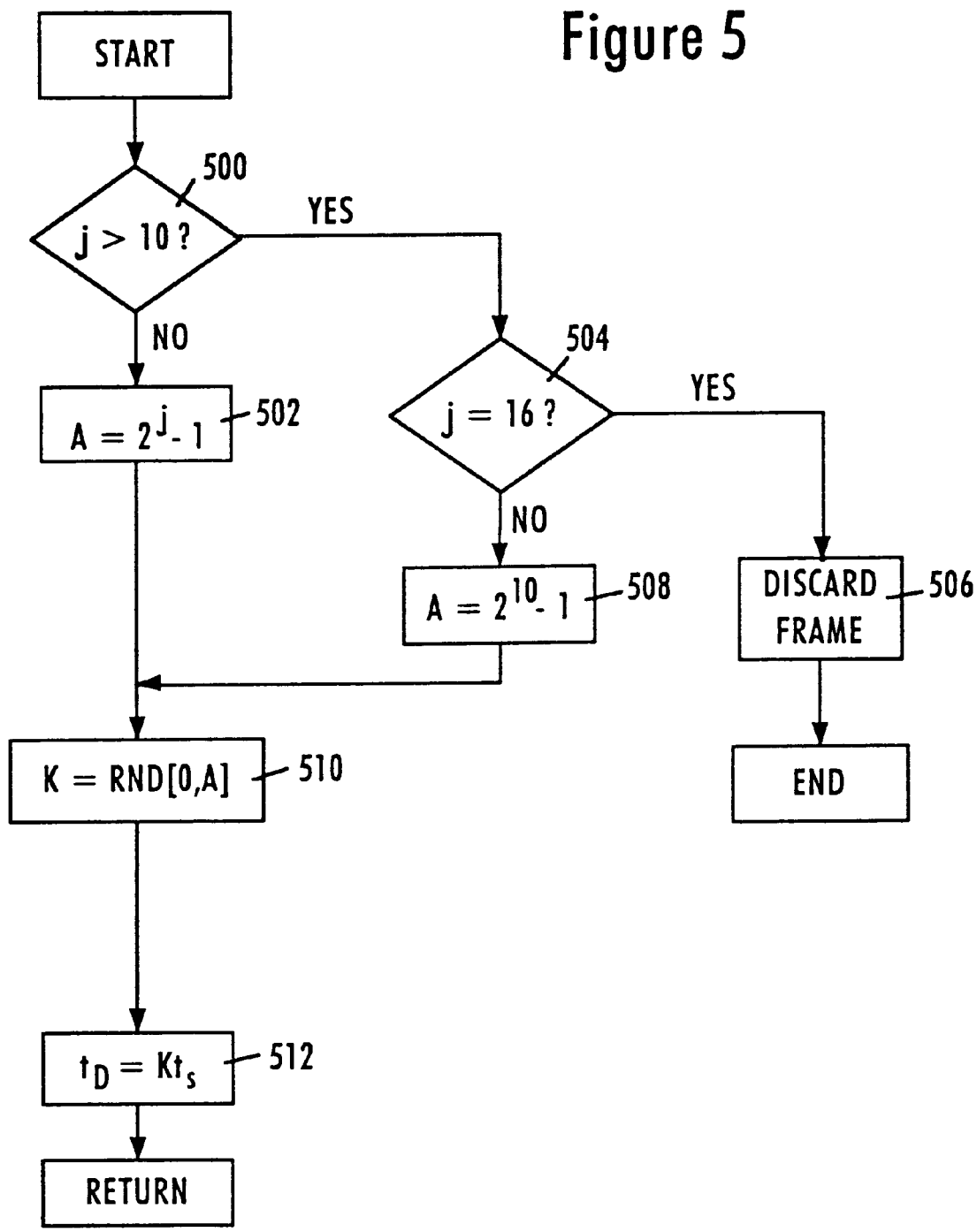
FIG. 5 is a flow diagram illustrating the truncated binary exponential (TBEB) algorithm.

FIG. 5 is a flow diagram illustrating operation of the truncated binary exponential backoff (TBEB) algorithm, where the exponential range of randomly selected integers is based upon an integer value j corresponding to the value of the attempt counter ($N_A$), such that $j=(N_A)$. Hence, the operation of FIG. 5 can be characterized by the function $f(j)=TBEB(j)$.

The TBEB algorithm according to the operation TBEB(j) begins in step 500, where the MAC 22 checks if the value j is greater than or equal to ten. If the operand j is less than ten in step 500, then an exponential number of access attempts (A) is determined in step 502 according to the equation $A=2^j-1$. If in step 500 the operand j is greater than or equal to 10, the MAC 22 then checks in step 504 if j equals 16. If j equals 16, then the frame or data packet to be transmitted is discarded in step 506 in accordance with Ethernet (ANSI/IEEE 802.3) protocol. If j is less than 16 in step 504, then the exponential number of access attempts is set in step 508 to $A=2^{10}-1$, or 1023.

After calculating the exponential number of access attempts A, the MAC 22 randomly selects an integer value (k) in step 510 from the range between zero and the exponential number of access attempts and having a maximum value of 1023. The MAC 22 then calculates the delay time ($t_D$) in step 512 by multiplying the predetermined slot time ($t_s$) with the randomly selected integer k.

A slot time ($t_s$) has a duration equal to 512 bit times for 10 and 100 Mbits/s networks. Hence, a slot time will have a duration of 51.2 microseconds in a 10 megabit per second network and 5.12 microseconds in a 100 megabit per second network. The slot time ($t_s$) for a 1000 Mbit/s network is selected in accordance with the network topology and propagation delay, and preferably has a duration equal to 4096 bit times.

As described above, the network node can overcome the capture effect by resetting the attempt counter ($N_A$) to one in order to provide a greater probability that the network node will select either zero or one slot times for collision mediation, resulting in a higher degree of probability of winning the collision mediation.

Figure 2C:
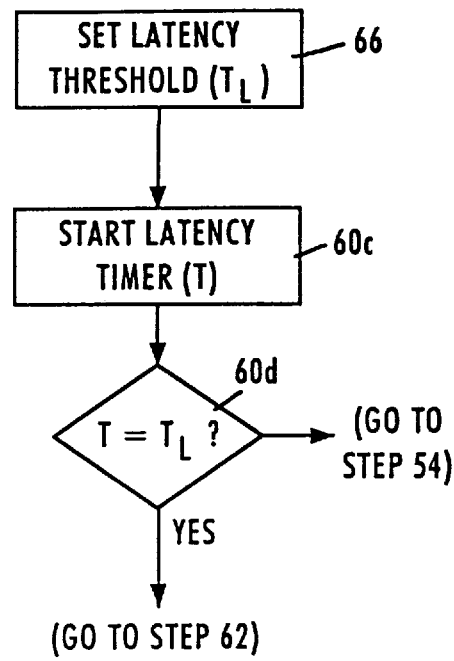
Figure 2D:
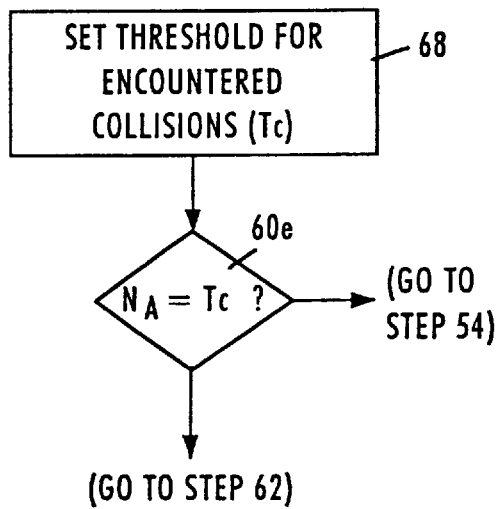

FIGS. 2B, 2C and 2D are flow diagrams illustrating alternative steps for detecting the capture effect. The MAC 22 can determine whether the network node has been locked out too long from accessing the network media based on the number of packet transfers on the medium, the access latency of a data packet to be transmitted by the network node, or the number of collisions encountered by the network node.

FIG. 2B illustrates detecting capture effect based on the number of packet transfers on the medium 50. The MAC 22 sets in step 54 a threshold for packet transfers on the medium by other network nodes ($T_p$). The threshold ($T_p$) may be preprogrammed, or may be supplied by a user or an external management entity. The MAC 22 monitors in step 60a the network media 50 for packet transfers by other network nodes, and counts the number of the packet transfers by other network nodes ($N_p$). The MAC 22 then checks in step 60b whether the number of packet transfers by other network nodes ($N_p$) equals the packet threshold ($T_p$). If the number of packet transfers equals the packet threshold, then capture effect is detected and the MAC 22 performs step 62 to overcome the capture effect.

FIG. 2C provides an alternative technique for detecting capture effect, where a latency threshold ($T_L$) is set in step 66, for example by a user or an external management entity. The MAC 22 starts a latency timer T in step 60c upon encountering a collision, or, alternatively, upon losing the collision mediation. The MAC 22 then checks in step 60d if the latency timer T equals the latency threshold $T_L$ in step 60d, and selectively resets the attempt counter $N_A$ to one in step 62 if the latency timer equals the latency threshold. Alternatively, the backoff interval can be set to zero.

FIG. 2D illustrates the technique of detecting capture effect based upon the number of collisions encountered by the network node. A threshold for encountered collisions ($T_c$) is set by the MAC 22 in step 60a, and the MAC 22 checks in step 60e if the value of the collision attempt counter ($N_A$) equals the threshold $T_c$ in step 60e. If the number of encountered collisions equals the threshold, then the MAC 22 executes step 62, shown in FIG. 2A.

APPLICATIONS REQUIRING GUARANTEED ACCESS

Figure 3:
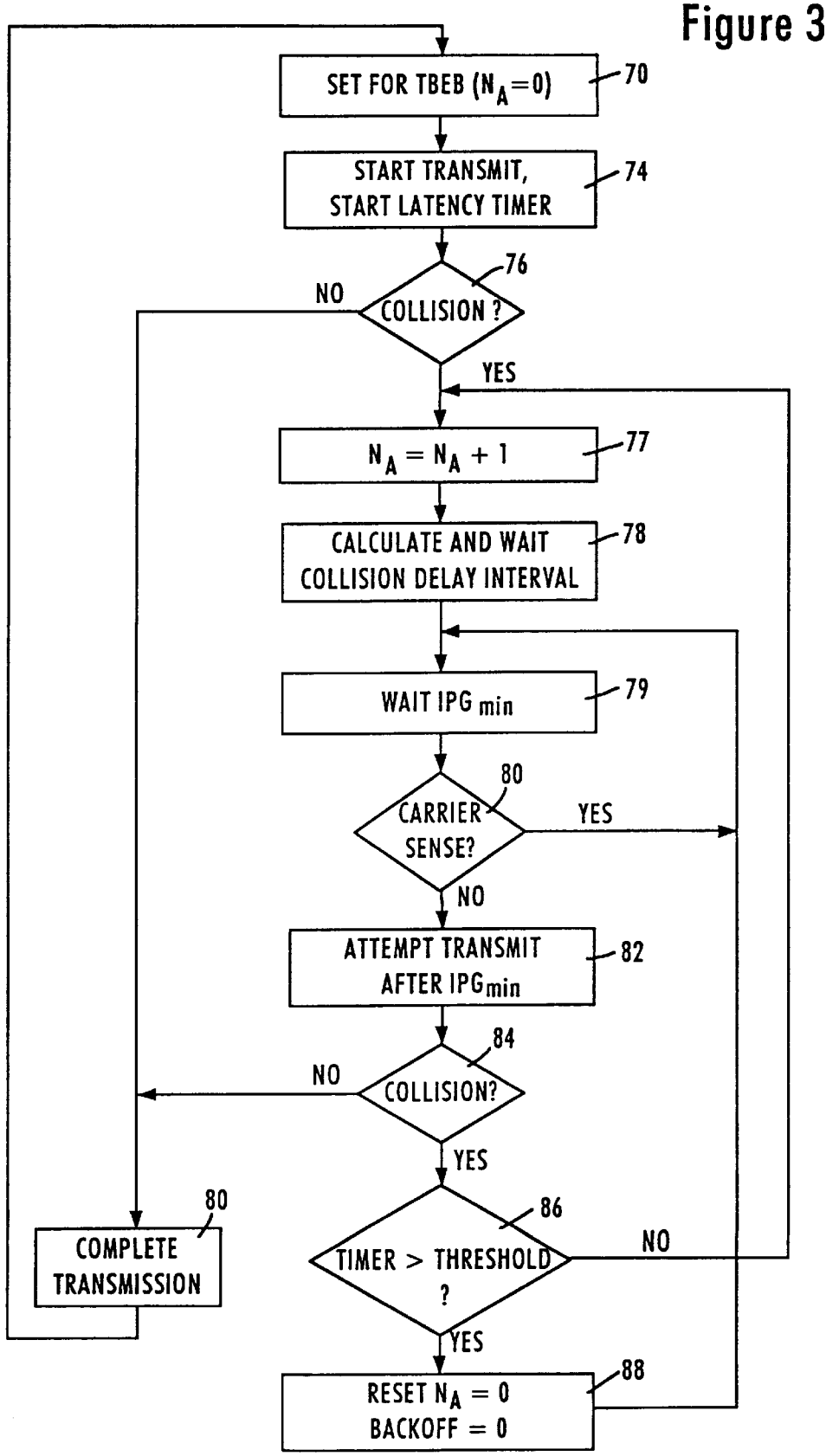
FIG. 3 is a flow diagram of a method for accessing media of the network according to a second embodiment of the present invention.

FIG. 3 is a flow diagram of a method for overcoming capture effect according to a second embodiment of the present invention. The second embodiment is primarily beneficial for a multimedia application in achieving guaranteed access latency. The arrangement of FIG. 3 uses a latency timer to specify when the network node should obtain access to the media. Upon reaching a prescribed threshold, the attempt counter is reset. The collision backoff delay is also forced to zero if the network node encounters another collision. The step of forcing the backoff delay to zero slot time is repeated until the packet is transmitted. Hence, the network node is guaranteed to transmit, since other nodes will be used the standard TBEB algorithm, forcing the other networks stations to defer to the zero slot time of the aggressive network node. After successful transmission, the network node returns to normal mode of operation. The disclosed arrangement of the second embodiment is particularly useful for applications such as downstream single source broadcasting, real time applications, such as web TV, real time control and data logging for which a minimum bandwidth is reserved.

As shown in FIG. 3, the MAC 22 is set for the conventional TBEB algorithm and the attempt counter ($N_A$) is reset to zero in step 70. Assuming the MAC 22 has a data packet to send, the MAC 22 starts a latency timer and attempts to transmit the data packet (following waiting the minimum IPG) in step 74. If a collision is encountered in step 76 during transmission of the data packet, the MAC 22 increments the attempt counter ($N_A$) in step 77 and performs collision mediation in step 78 by calculating and waiting a collision delay interval. However, if there is no collision in step 76, the MAC 22 completes transmission in step 80, and prepares to transmit another data packet in step 74.

Assuming the latency time has not reached a prescribed threshold, the collision mediation in step 78 will be executed according to the conventional TBEB algorithm. After waiting the collision delay interval of a specified number of slot times in step 78, the MAC 22 waits at least the minimum IPG ($IPG_{MIN}$) in step 79 and monitors the media in step 80 during the minimum IPG to determine the presence of a receive carrier. If a receive carrier is sensed, then the MAC 22 continues to defer to the packet being transmitted.

Following deassertion of the receive carrier, the MAC 22 waits the minimum IPG in step 82 and attempts transmission of the data packet. The MAC 22 then checks if a collision occurs in step 84. Assuming the MAC 22 detects a collision in step 84, the MAC 22 then checks in step 86 whether the latency timer exceeds a prescribed latency threshold in step 86, for example as shown in FIG. 2C. If the latency timer has not exceeded the prescribed threshold, then the MAC 22 increments the attempt counter ($N_A$) in step 77 and performs conventional collision mediation in step 78. However, if the latency timer exceeds the prescribed threshold, then the MAC 22 resets the attempt counter ($N_A$) to zero and sets the collision backoff interval to zero in step 88. After setting the collision delay interval to zero in step 88, the MAC 22 then immediately begins waiting the minimum IPG in step 79, and beings to retransmit the data packet in step 82.

Hence, the arrangement of FIG. 3 enables a network node requiring guaranteed access latency to aggressively access the media during collision mediation by setting the collision interval to zero slot time. If the network node encounters repeated collisions, the network node will continue to set the collision delay interval to zero slot times until the data packet is successfully transmitted.

Hence, the second embodiment enables aggressive access of the media when necessary to ensure access latency. Although the latency timer is shown in FIG. 3 as starting when the MAC 22 has the data to transmit, the latency timer may also be started at different times, for example upon detecting a collision, or upon determining that the MAC 22 has lost collision mediation.

PROVIDING GUARANTEED ACCESS LATENCY FOR MULTIPLE NETWORK NODES.

The above-described second embodiment is particularly advantageous for a network having a single network node requiring guaranteed access latency. If the network includes many network nodes requiring access latency, a more appropriate arrangement would be the method of accessing the media according to a third embodiment of the present invention, described below with respect to FIGS. 4A and 4B.

Figure 4A:
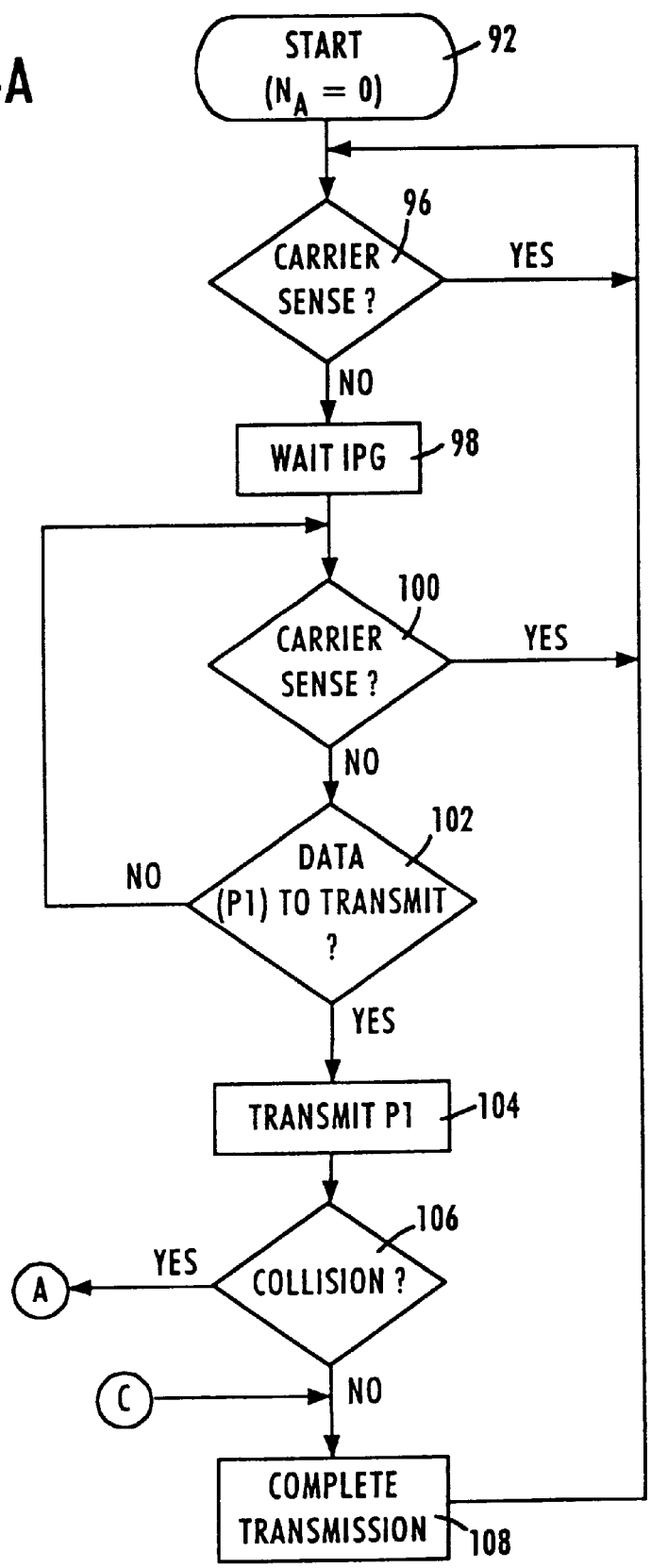
FIGS. 4A and 4B are flow diagrams of a method for accessing media of the network according to a third embodiment of the present invention.

As shown in FIG. 4A, the MAC 22 starts in step 92, and checks in step 96 whether the receive carrier is sensed. If the receive carrier is sensed, the MAC 22 waits in step 96 until deassertion of the receive carrier on the media 50 is detected. The MAC 22 waits the minimum IPG in step 98, and checks in step 100 if the receive carrier is detected on the media 50 while waiting the minimum IPG. If a carrier is detected in step 100, the MAC 22 returns to the wait state in step 96. If no carrier is detected in step 100, the MAC 22 checks in step 102 whether the transmit FIFO 32 has a data packet (P1) to send. Assuming the transmit FIFO 32 has data to send, the MAC 22 begins to transmit the data packet in step 104. If during transmission of the data packet P1 the MAC 22 detects a collision in step 106, the MAC 22 performs the modified collision mediation, shown in FIG. 4B. If no collision is detected, transmission is completed in step 108.

Figure 4B:
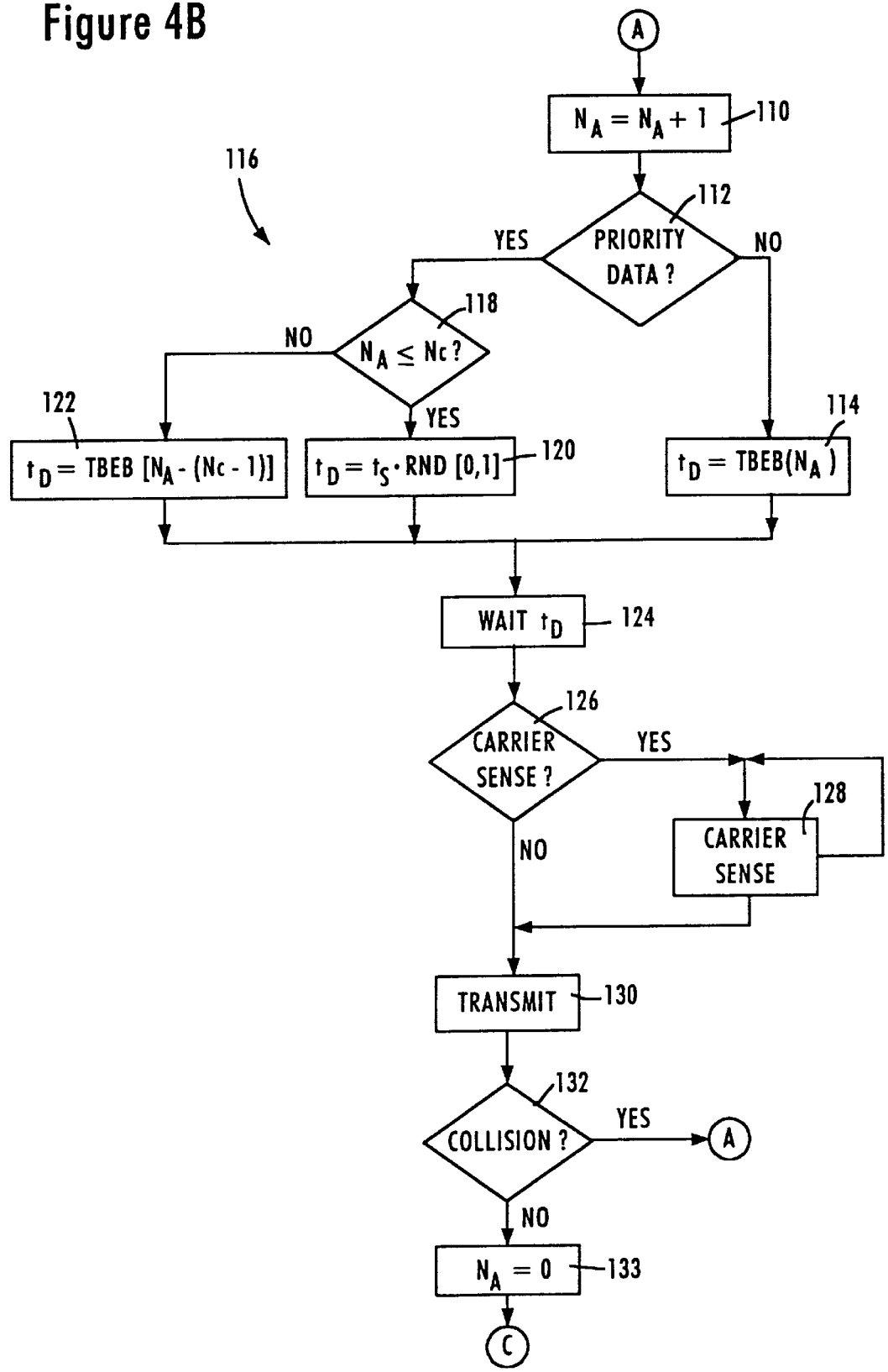

FIG. 4B illustrates an arrangement for limiting access latency in the network node by selectively determining a collision delay interval between the conventional TBEB algorithm, an integer randomly selected from a prescribed range of integers, and an integer randomly selected from a second range of integers calculated from an exponential number based upon a shifted prescribed value. According to the disclosed embodiment, the MAC 22 begins collision mediation by incrementing the attempt counter $N_a$ in step 110. The MAC 22 then determines the priority of the data to be transmitted in step 112. If the MAC 22 determines in step 112 that the data to be transmitted is not priority data, the MAC 22 performs conventional collision mediation using the TBEB algorithm in step 114, to calculate the collision backoff interval based on the function $t_D$=TBEB($N_A$).

If in step 112 the MAC 22 determines the data to be high priority data, the MAC 22 determines the collision delay interval for high priority data, referred to generally in FIG. 4B as step 116.

The collision mediation for high priority data determines in step 118 if the number of collisions encountered is less than or equal to the predetermined value $N_c$. If the number of collisions encountered is less than or equal to the predetermined value ($N_c$), the MAC 22 in step 120 randomly sets the collision delay interval ($t_D$) to zero or one time slot. Hence, the MAC 22 in step 80 uses a randomizing function to randomly select an integer from the predetermined range of integers [0,1].

If in step 118 the number of collisions encountered is greater than the predetermined value (e.g., $N_c$=3), the MAC 22 in step 122 sets the collision delay interval ($t_D$) to an integer multiple of the predetermined slot time interval ($t_s$) using a shifted version of the TBEB algorithm, where the MAC 22 randomly selects the integer from a shifted exponential number of access attempts according to the function TBEB [$N_A-(N_c-1)$]. Hence, if the number of collisions equals four and the predetermined value equals three (i.e., $N_c$=3), the MAC 22 in step 122 would perform the function TBEB(2), such that the high priority traffic would have an integer multiple of slot times randomly selected from the range [0,3]. Hence, the TBEB algorithm in step 122 is a shifted version of the TBEB algorithm in step 114, where the shifted exponential number of access attempts equals $2^{N-Y}$, where Y corresponds to the predetermined value $N_c$ (i.e., $Y=N_c-1$).

Following calculation of the collision delay interval ($t_D$), the MAC 22 waits the calculated delay interval in step 124, and checks in step 126 whether a receive carrier is sensed on the media during a minimum IPG interval. Assuming there is no carrier sense, the MAC 22 transmits in step 130, and checks for a collision in step 132. If the MAC 22 encounters a collision, the collision mediation of FIG. 4B is repeated. If there is no collision, the attempt counter ($N_A$) is reset in step 133.

According to a third embodiment, the network node switches to different collision mediation modes, depending on the priority of the traffic and the number of encountered collisions. Hence, different network nodes having high priority traffic may aggressively contend for access of the media, without one network node overwhelming the other network nodes.

BREAKING CAPTURE EFFECT BY A NODE

Figure 6:
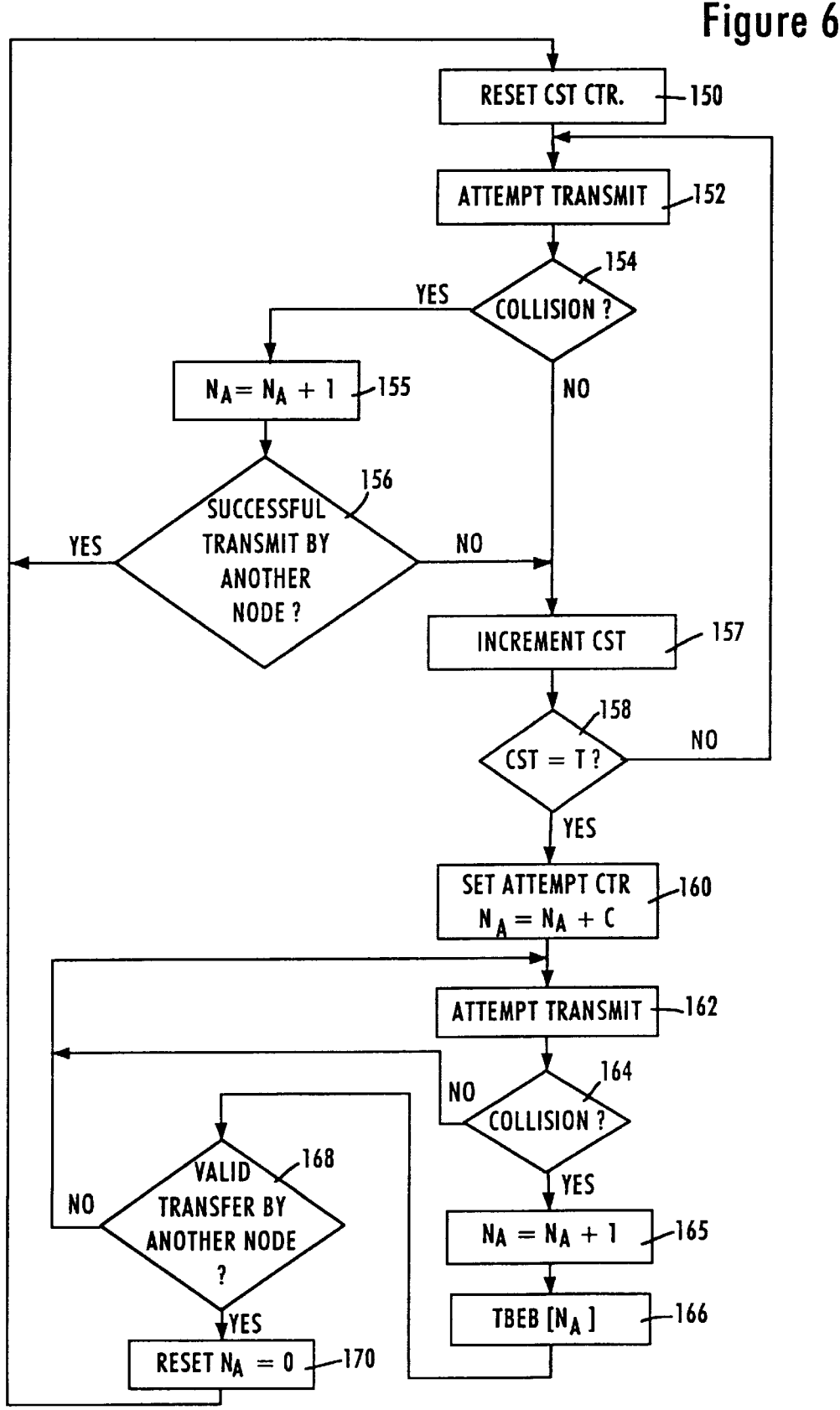
FIG. 6 is a flow diagram of a method for accessing media of the network according to a fourth embodiment of the present invention.

FIG. 6 is a flow diagram of an arrangement for overcoming capture effect according to a fourth embodiment of the present invention, where a network node having captured the network media increases the attempt counter to provide a higher probability of losing collision resolution. Hence, the arrangement of FIG. 6 provides other stations contending for access a greater opportunity of accessing the medium, thereby eliminating the capture effect. The method begins in step 150, where the MAC 22 resets a consecutive station transmit (CST) counter that counts the consecutive number of successful transmissions by the MAC 22. The MAC 22 then attempts transmission of a data packet in step 152, and determines whether a collision is encountered in step 154. Assuming a collision is encountered in step 154, the MAC 22 then increments the attempt counter in step 155. The MAC 22 then determines whether another network node successfully transmitted a packet in step 156, indicating the MAC 22 has not captured the media. If another network node has successfully transmitted a packet, then the MAC 22 resets the CST counter in step 150, indicating that the network node has not captured the media. Otherwise, the MAC 22 increments the CST counter in step 157.

The MAC 22 then checks in step 158 whether the CST counter equals a prescribed threshold T in step 158. If the CST counter value does not equal the threshold, then the network node has not yet captured the medium 50, and the MAC 22 can attempt transmission of another data packet in step 152 according to conventional Ethernet protocol.

However, if the CST counter equals the threshold, then the MAC 22 sets the attempt counter equal to a prescribed value, for example by increasing the attempt counter by a prescribed value (e.g., $N_A=N_A+C$) in step 160. Hence, the attempt counter ($N_A$) is automatically incremented to a larger value to increase the range of random slot times. The MAC 22 then continues to transmit another data packet in step 162, and detects in step 164 whether the network node encounters a collision in step 164. Assuming the network node encounters a collision in step 164, the MAC 22 again increments the attempt counter in step 165, and performs collision mediation in step 166. The increased range increases the probability that the network node will lose collision mediation. If in step 168 the MAC 22 detects a valid data transfer by another node, then the MAC 22 resets the attempt counter ($N_A$) in step 170 and the CST counter in step 150.

Figure 7:
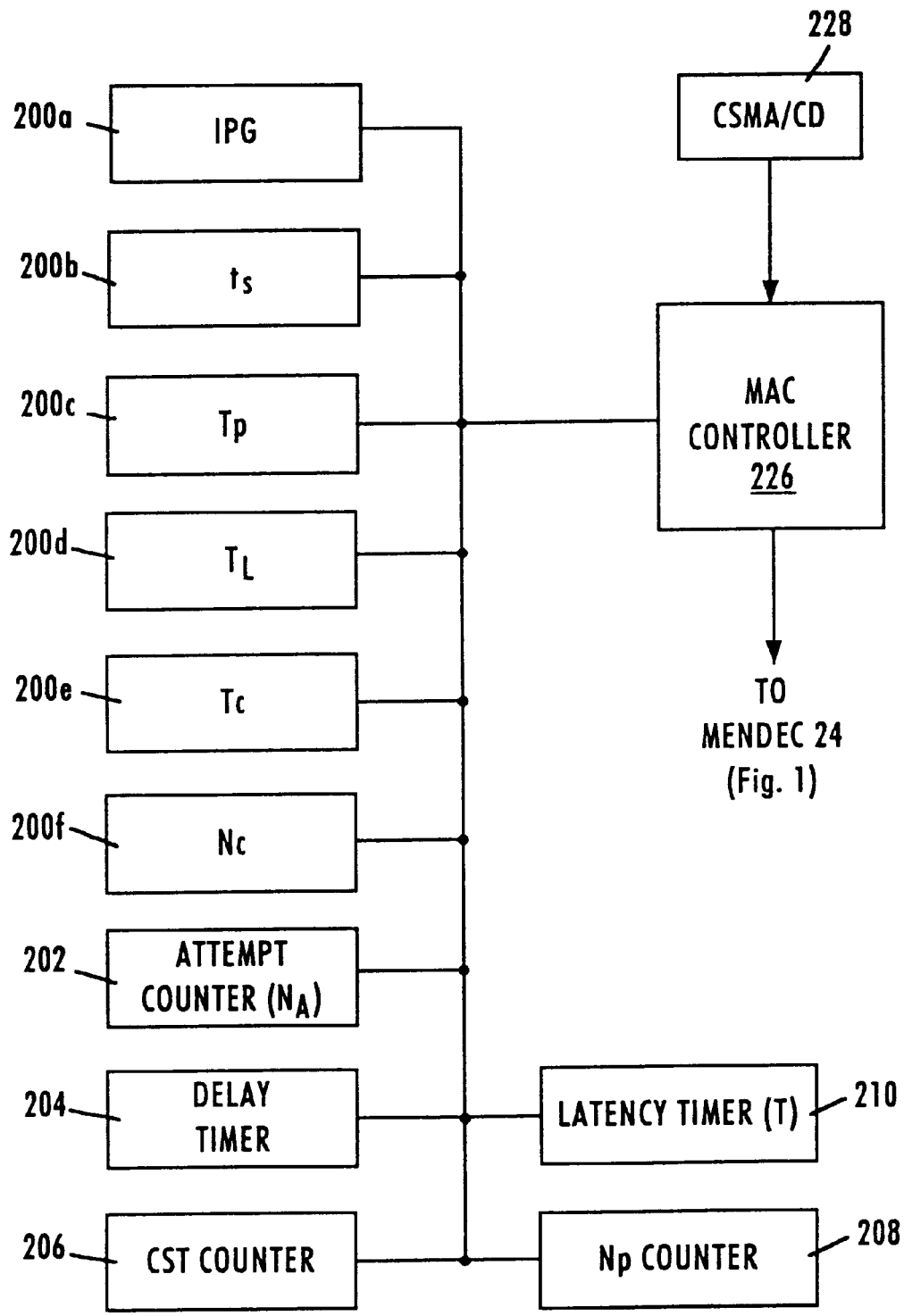
FIG. 7 is a block diagram of the media access control (MAC) of FIG. 1.

FIG. 7 is a block diagram illustrating the functional components of the MAC 22 in a network node. The media access control 22 includes a plurality of registers 200 for storing timing values and threshold values as described in the above figures. The MAC 22 also includes counters and timers, for example a collision counter 202 storing the number of access attempts ($N_A$), a delay timer 204 that counts the determined collision delay interval, a CST counter 206 counting the number of consecutive successful transmissions by the network node, a counter 208 counting the number of packet transfers ($N_P$) by other network nodes, and a latency timer (T) 210 for determining a latency as described in step 60d of FIG. 2C. The MAC 22 also includes a controller 226 and a carrier sense multiple access/collision detection (CSMA/CD) portion 228. The values of the IPG and $t_s$ stored in registers 200a and 200b are preloaded in a non-volatile memory element. Registers 200c, 200d, 200e, and 200f are programmed with the threshold value $T_P$, $T_L$, $T_C$, and $N_C$ as described above with respect to steps 64, 66, 68, and 118, respectively.

The MAC controller 226 starts the delay timer in response to a signal from the CSMA/CD 228 indicating that deassertion of the receive carrier on the media has been sensed. The controller also includes capture logic configured for determining capture of the network media according to the steps illustrated in FIGS. 2B, 2C, and 2D.

According to the present invention, selectively modifying the collision mediation in the networks station enables the network node to selectively overcome the effects of capture effect, whether the capture effect is caused by other network nodes or the network node itself. Moreover, the network node may be programmed to contend more aggressively for the media in order to guarantee equality of service in applications requiring a limited access latency.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. A method of accessing network media by a network node, comprises:

detecting a capture effect on the network media based on a prescribed threshold;

sensing a collision on the network media;

resetting an attempt counter storing the number of access attempts to a reset value in response to the detected capture effect;

selectively determining a slot time interval from one of (1) a first integer randomly selected from a first range of integers calculated from an exponential number of access attempts by the network node, and (2) a modified number of slot times in response to the detected capture effect by randomly selecting from a second range of integers calculated from an exponential number of said reset value; and attempting access of the media in response to the detected collision and after the selectively determined slot time interval.

2. The method of claim 1, wherein:

the capture effect detecting step comprises detecting an inability by the network node to access the network media; and the resetting step comprises reducing the attempt counter to a prescribed value in response to the detected inability by the network node to access the network media.

3. The method of claim 2, wherein the inability detecting step comprises:

identifying a presence of a data packet for transmission by the network node on the network media; and determining if a number of packets transmitted by other stations on the network media subsequent to the identified presence of said data packet for transmission exceeds the prescribed threshold.

4. The method of claim 2, wherein the inability detecting step comprises:

identifying a presence of a data packet for transmission by the network node on the network media; and determining if an access latency for the data packet for transmission by the network node reaches the prescribed threshold.

5. The method of claim 4, wherein the step of determining if the access latency reaches a prescribed threshold comprises:

attempting transmission of the data packet;

starting a latency timer in response to a collision encountered during transmission of the data packet; and comparing the latency timer to a prescribed threshold.

6. The method of claim 4, wherein the step of determining if the access latency reaches a prescribed threshold comprises:

attempting transmission of the data packet; and starting a latency timer in response to detection of a carrier on the media by another network node following a collision encountered during transmission of the data packet; and comparing the latency timer to the prescribed threshold.

7. The method of claim 2, wherein the inability detecting step comprises detecting if the attempt counter reaches the prescribed threshold based on a corresponding number of said sensed collisions.

8. The method of claim 2, wherein the resetting step comprises resetting the attempt counter to equal one.

9. The method of claim 1, wherein:

the capture effect detecting step comprises detecting capture of the network media by the network node; and the resetting step comprises incrementing the attempt counter by a prescribed integer value in response to the detected capture of the network media by the network node.

10. The method of claim 1, wherein the selectively determining step comprises setting the modified number of slot times to zero in response to the detected capture effect by another network node.

11. The method of claim 1, wherein the selectively determining step comprises:

if a number of collisions encountered by the network node is greater than the prescribed threshold, randomly selecting the modified number of slot times from a second predetermined range of slot times; and if the number of collisions encountered by the network node is greater than a second prescribed threshold having a value greater than the prescribed threshold, randomly selecting the modified number of slot times from a third range of integers calculated from an exponential shifted number, the shifted number corresponding to said access attempts shifted by a prescribed number.

12. A method of limiting access latency in a network node during data transmission of a packet onto a network having a plurality of network nodes requiring limited access latency, comprising:

determining a number of collisions encountered by the network node;

selectively determining a collision delay interval, based on the number of collisions, by multiplying a predetermined delay interval with a selected one of (1) a first integer randomly selected from a prescribed range of integers, and (2) a second integer randomly selected from a second range of integers calculated from an exponential number, the exponential number based on the number of collisions shifted by a prescribed value; and attempting access of the media after waiting the determined collision interval;

wherein the selectively determining step comprises:

selecting the first integer if the number of collisions is less than a prescribed threshold; and selecting the second integer if the number of collisions is greater than or equal to the prescribed threshold, the prescribed value corresponding to the prescribed threshold.

13. The method of claim 12, wherein the prescribed range of integers equals zero and one.

14. A network interface for connection with network media, comprising:

a collision sensor configured for sensing a collision on the media;

capture logic configured for determining capture of the network media;

a resettable attempt counter storing a number of access attempts by the network interface;

a collision interval calculator configured for selectively calculating a delay time based on a number of access attempts by the network interface and the determined capture of the network media, including calculating the delay time based on a first integer randomly selected from a first range of integers calculated from an exponential number of access attempts in the attempt counter when there is no capture of the network media and resetting the attempt counter when there is capture of the network media and calculating the delay time based on a second integer randomly selected from a second range of integers calculated from an exponential number of access attempts in the reset attempt counter; and a media access device configured for attempting access of the media in response to the sensed collision and after the calculated delay time.

15. The network interface of claim 14, wherein the capture logic comprises:

a programmable threshold register; and a prescribed event counter for counting prescribed events relative to activity on the media, the capture logic determining the capture of the network media based on the programmable threshold register and the counter.

16. The network interface of claim 15, wherein the prescribed event counter is an attempt counter for counting a number of transmission attempts by the network node relative to collisions on the media.

17. The network interface of claim 15, wherein the prescribed event counter is a latency time counter for counting an access latency relative to a data packet to be transmitted by the network node.

18. The network interface of claim 15, wherein the prescribed event counter is a data packet counter for counting a number of data packets transmitted by other network nodes on the media relative to a data packet to be transmitted by the network node.

19. The network interface of claim 15, wherein the prescribed event counter is a consecutive station transmit counter counting a number of consecutive packets transmitted by the network node.

* * * * *